United States Patent [19]

Wichert et al.

[11] Patent Number: 4,978,090

[45] Date of Patent: Dec. 18, 1990

[54] REMOTE-HANDLED PIPE SUPPORT

[75] Inventors: Bernhard Wichert, Neu Anspach; Klaus-Dieter Peine, Bad Soden, both of Fed. Rep. of Germany

[73] Assignee: Deutsche Gesellschaft Für Wiederaufarbeitung Von Kernbrennstoffen mbH, Hannover, Fed. Rep. of Germany

[21] Appl. No.: 316,870

[22] Filed: Feb. 28, 1989

[30] Foreign Application Priority Data

Feb. 29, 1988 [DE] Fed. Rep. of Germany ....... 3806380

[51] Int. Cl.⁵ ............................................. F16L 3/08
[52] U.S. Cl. .................................. 248/74.1; 248/316.5
[58] Field of Search ................... 248/74.1, 74.4, 316.5, 248/231.5, 65; 24/519, 514, 458, 529, 284; 405/169

[56] References Cited

U.S. PATENT DOCUMENTS

| 2,233,458 | 3/1941 | Segre | 248/74.4 X |
| 2,347,081 | 4/1944 | Caton | 24/514 X |
| 2,718,075 | 9/1955 | McLeod | 24/514 X |
| 2,849,777 | 9/1958 | Ridgers | 248/74.1 |
| 3,203,421 | 8/1965 | Bialick | 24/514 X |
| 4,436,266 | 3/1984 | Gerding | 248/65 X |
| 4,445,255 | 5/1984 | Olejak | 24/284 |

FOREIGN PATENT DOCUMENTS 2633754 1/1978 Fed. Rep. of Germany ..... 248/74.1

*Primary Examiner*—J. Franklin Foss
*Attorney, Agent, or Firm*—Toren, McGeady & Associates

[57] ABSTRACT

A remote-handled pipe support including a bracket bolted to a fixed flat bar, the bracket clamping a pipe by means of a stationary jaw and a pivoted jaw fixed with the aid of a remote-handled screw.

6 Claims, 2 Drawing Sheets

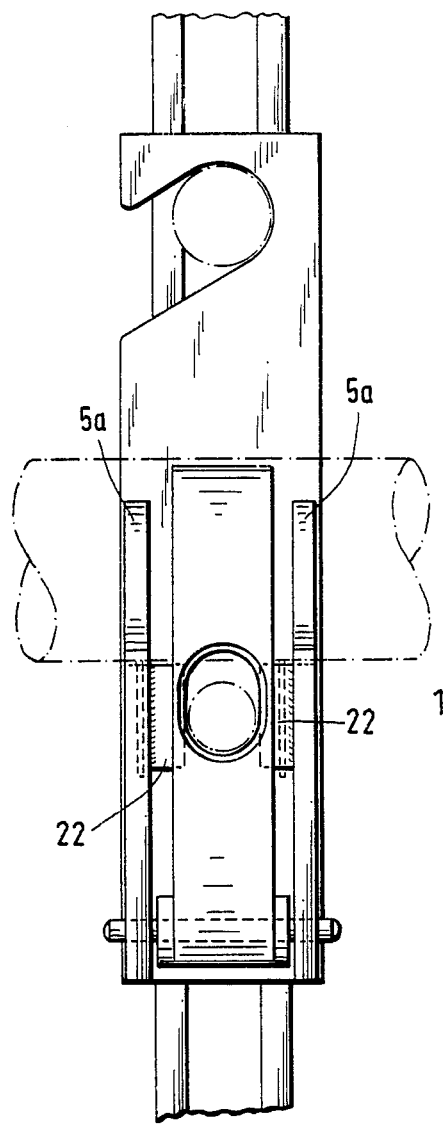
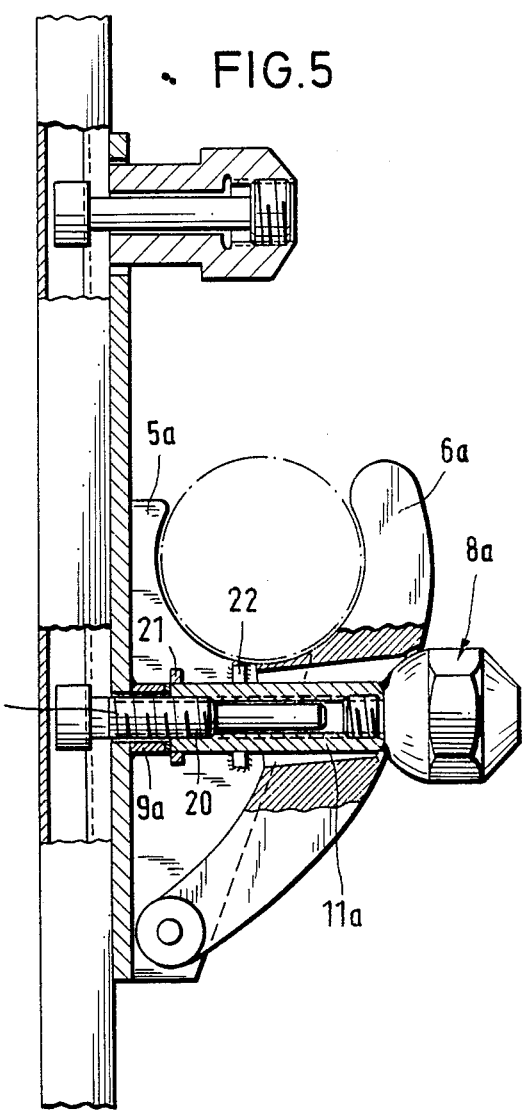
FIG.4
FIG.5

REMOTE-HANDLED PIPE SUPPORT

BACKGROUND OF THE INVENTION

The invention relates to a remote-handled pipe support that is particularly suitable for nuclear power stations, reprocessing plants, and similar situations.

There are restricted areas in which pipes cannot be fitted directly by personnel because of high-activity levels, for instance in nuclear power stations, reprocessing plants or other hazardous areas. In these cases, the work has to be performed by remote controlled equipment such as robots and manipulators. Consequently, the components to be fitted must be designed so as to permit easy installation by means of said equipment.

SUMMARY OF THE INVENTION

It is an object of the invention to provide a pipe support which permits convenient remote handling.

Pursuant to this object, and others which will become apparent hereafter, one aspect of the present invention resides in a pipe support in the form of brackets bolted to flat bars. The brackets clamp a pipe by means of a stationary jaw and a pivoted jaw fixed with the aid of a remote-handled screw.

This configuration permits convenient fitting of pipes by means of robots or other remote handling devices because the pipe can first be placed upon the bracket as a preliminary support. In order to clamp the pipe the remote-handling device must close the clamping jaw and tighten the fitting screw.

According to one embodiment of the invention, the bracket is attached to a flat bar with a pivot for the clamping jaw and a threaded pin for the fixing screw of the jaw. This arrangement permits not only clamping of the pipe with the aid of remote handling devices but also mounting of the complete pipe support using the flat bar including the clamping jaw and the threaded pin for the fixing screw. Hence, the main components of this device are integrated into a single assembly.

It is useful to insert a segment into the bracket, which segment is of a size and shape required for a particular pipe. This also applies to the segment of the clamping jaw. Such segments permit not only preliminary placing of prefabricated pipes but also final clamping of the finished pipes.

In order to be able to mount pipes of different diameters by means of the same devices, the invention provides for clamping jaws with replaceable segments, the inside diameter of which corresponds to the outside diameter of the pipe to be clamped. Therefore, it is possible to insert segments of the required size and shape and to reuse the same clamping device for a different diameter with only having to change the segments.

It is desirable to have the pivot of the clamping jaw arranged below its center of gravity so that the jaw opens by its own dead weight when the fixing screw is loosened.

In order to limit the downward opening motion of the clamping jaw, the flat bar may be equipped with a bow-type stop.

The invention further provides for a fixing screw with a bush-type end and female thread, the threaded pin being screwed into the end and the bush-type end being used as a stop for limiting the clamping force of the screw.

The embodiments described above ensure convenient remote handling, particularly the handling of the fixing screw because it is relatively easy to insert a bush-type screw and to screw it upon a stationary threaded pin, and because the clamping force of the screw is limited by the stop so as to prevent thread destruction due to overload.

Preferred embodiments of the invention will be described below in connection with the accompanying drawings.

BRIEF DESCRIPTION OF THE DRAWINGS

FIG. 4 is a front view of a further embodiment of the device similar to FIG. 3; and FIG. 5 is a side view of the further embodiment similar to FIG. 1.

DETAILED DESCRIPTION OF THE PREFERRED EMBODIMENTS

Figure 1:
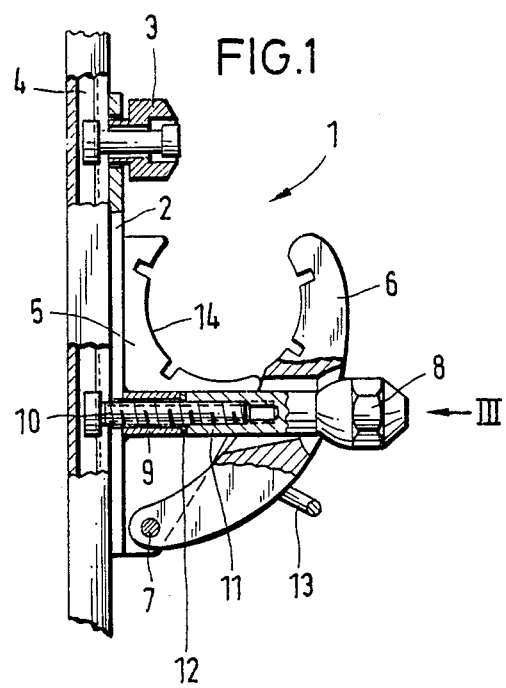
FIG. 1 shows a cross-sectional view of a pipe support pursuant to the present invention.

As can be seen from the drawing, the device 1 mainly consists of a bracket 2 attached to a C-bar 4 by means of a fixing screw 8 in such manner that it can be adjusted vertically. Moreover, the bracket 2 supports the devices required to clamp the pipe not shown in the above figures. Stationary jaw 5 is, for instance, welded to bracket 2 and a pivoted jaw 6 serves to clamp and unclamp the pipe. Clamping jaw 6 is attached to bracket 2 by means of a pivot 7 arranged so that the jaw opens by its own dead weight when loosening the fixing screw 8.

In order to position fixing screw 8, a sleeve 9 (for instance a guide bush) is incorporated into bracket 2, the sleeve being penetrated by a threaded pin 10 which is screwed into a bushing-type end 11 of fixing screw 8 when the device is clamped. The contact surface between sleeve 9 and bush-type end 11 of screw 8 can be lined with a shim or spacer 12.

In order to limit the opening motion of the pivoted jaw 6 when the screw 8 is unscrewed, a bow-type stop 13 prevents the jaw 6 from dropping further downwards, this feature being of major importance for remote-handled pipe supports.

Figure 2:
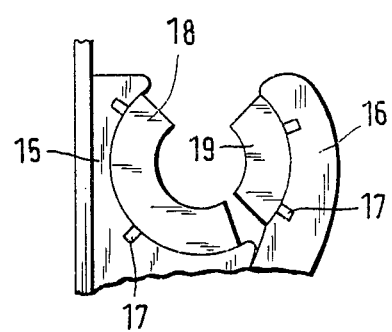
FIG. 2 is a detail of clamping jaws with inserted segments.
Figure 3:
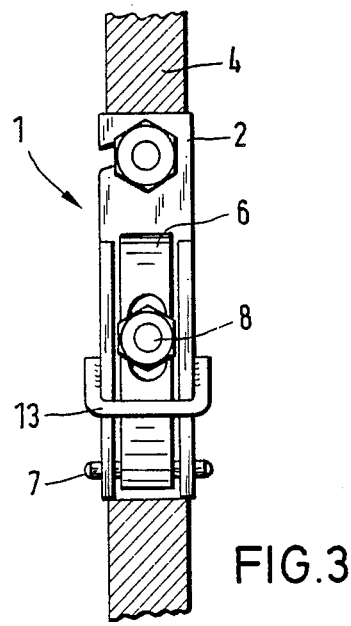
FIG. 3 is a plan view in the direction of arrow III in FIG. 1.

Stationary jaw 5 and pivoted jaw 6 are shaped to match the pipe to be clamped, i.e., the internal contours are circular. In FIG. 2, reference number 15 corresponds to stationary jaw 5 and reference number 16 corresponds to pivoted jaw 6.

The jaws 15, 16 are provided with fixing holes or slots 17 for inserting segments 18, 19 which can be replaced by segments of any size required for the pipes to be clamped (FIG. 2).

FIGS. 4 and 5 illustrate a modified embodiment of the invention wherein the same reference numbers are utilized as far as possible, however with the addition of the letter "a".

In order to be able to do without the bow-type stop 13, the threaded pin 10a configured in the sleeve 9a is provided with a shortened threaded region 20 which, however, is long enough that the threaded bushing 11a of the fixing screw 8a can engage into the shortened threaded region 20.

The free end of the threaded sleeve 11a carries a stop ring 21 and stop plates 22 are welded so as to be stationary on the inner side of the stationary jaws 5a, and in a region coinciding with that region of the threaded pin which is free of threads.

If the fixing screw 8 is now loosened or if the manipulation tool turns too far in the opening direction, then the fixing screw 8 is screwed out of the threaded region 20 and arrives in the region free of threads. The stop disc 21 then abuts the stop plates 22 so that a complete disengagement of the fixing screw 8 is prevented.

While the invention has been illustrated and described as embodied in a remote-handled pipe support, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

1. A remote-handled pipe support, comprising:
   a fixed flat bar;
   a bracket having a stationary jaw and being bolted to said fixed flat bar so as to support a pipe to be clamped;
   a clamping jaw pivoted to said bracket, said stationary jaw and said clamping jaw defining an upwardly open pipe support, and said stationary jaw having a circle segment surface for contact with the pipe, which surface is of a larger circle segment than a corresponding surface of the clamping jaw and a remote-handled fixing screw for fastening said jaw; and
   moving said clamping jaw relative to said stationary jaw;
   wherein the pivot of said clamping jaw is arranged below its center of gravity so as to allow said clamping jaw to open by its own dead weight when said fixing screw is loosened.

2. A pipe support according to claim 1, and further comprising a threaded pin linked with said fixing screw and a sleeve for said threaded pin, said bracket being attached to said fixed flat bar with a pivot for said clamping jaw and said sleeve.

3. A pipe support according to claim 1, wherein said stationary jaw is adapted to the shape of the pipe to be clamped, said clamping jaw being similarly accordingly shaped.

4. A pipe support according to claim 3, wherein said stationary jaw and said clamping jaw each have replaceable segments with an inside diameter corresponding to an outside diameter of the pipe to be clamped.

5. A pipe support according to claim 1, and further comprising a bow-type stop arranged so as to limit the opening motion of said clamping jaw.

6. A pipe support according to claim 1, wherein said fixing screw is a sleeve with a female thread to be screwed onto a threaded pin, both components having contact surfaces forming a mechanical stop for limiting a clamping force of said fixing screw.

* * * * *